UNITED STATES PATENT OFFICE.

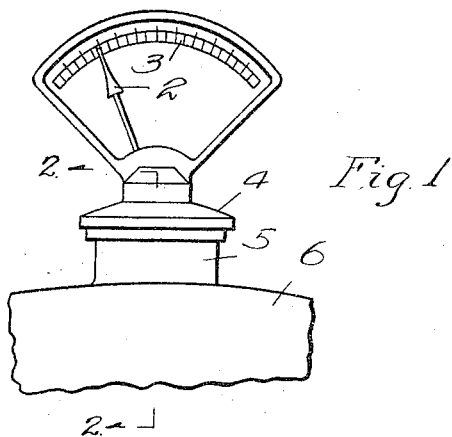
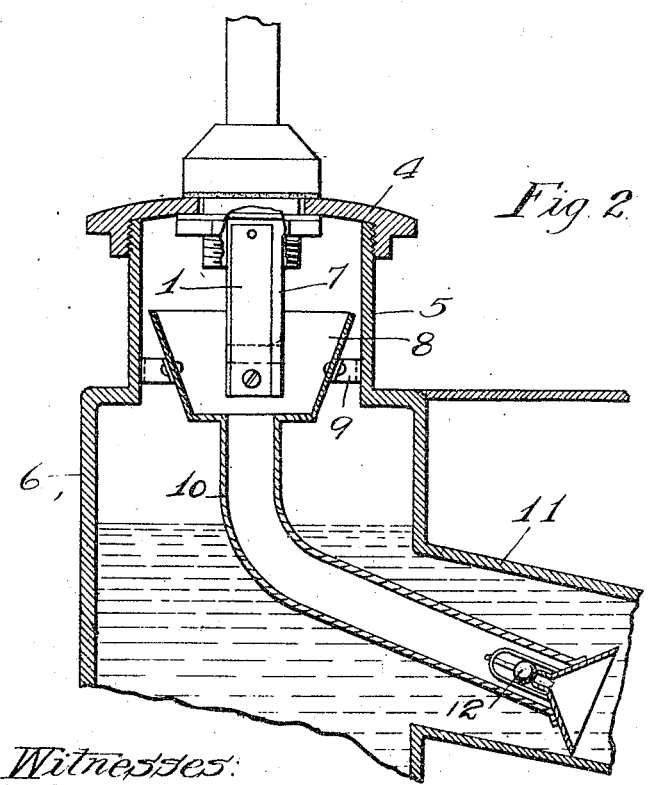

EDWARD A. LARSON, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE RADIATOR-THERMOMETER.

1,136,682.     Specification of Letters Patent.     Patented Apr. 20, 1915.

Application filed July 6, 1914. Serial No. 849,075.

*To all whom it may concern:*

Be it known that I, EDWARD A. LARSON, a citizen of the United States, residing at Chicago, in the county of Cook and State of Illinois, have invented new and useful Improvements in Automobile Radiator-Thermometers, of which the following is a specification, reference being had to the accompanying drawings, forming a part thereof.

The purpose of this invention is to provide means for conveying the cooling water of the circulating system of an automobile engine to a point which may be at some times above the normal level of the water in such system, with a view to bringing such water into close proximity to a thermometer whose purpose is to warn the driver of temperature conditions in the engine itself.

The invention comprises the features and elements described and shown in the drawings as indicated by the claims.

In the drawings:—Figure 1 is an elevation of a certain portion of an automobile radiator, showing the thermometer device applied thereto with its indicating means arranged outside the radiator for observation by the driver. Fig. 2 is a section on a larger scale, taken as indicated at line 2—2 on Fig. 1.

The thermometer device shown in the drawings is of a metallic type having a heat-responsive element, 1, consisting of a bi-metallic bar whose curvature is varied by changes of temperature, and which is operatively connected by mechanical means not shown so as to actuate an indicator needle, 2, causing it to traverse a scale, 3, which may be graduated in terms of temperature. This device is conveniently mounted as shown in Fig. 2 in the filler cap, 4, which closes the neck, 5, of the radiator, 6. On account of the wide variation in the length of the filler neck, 5, as provided on different makes of machines, it is found impracticable to make the frame, 7, which carries the element, 1, long enough to certainly support said element, 1, at a position below the normal water level in all radiators. The present invention is designed, therefore, to provide means which shall elevate a portion of the water to a position where it will surround the heat-responsive element, 1, so that the readings of the instrument may indicate the actual temperature of the water at all times, rather than merely the temperature in the air space above the water, which would not be a reliable index of conditions in the engine. Such means consist in a small cup or reservoir, 8, secured in the filler neck, 5, by means of radially projecting spring arms, 9, which may position the device merely by their frictional hold, or which may be soldered in position if desired. Leading from the open bottom of the receptacle, 8, there is shown a tube or pipe, 10, which should be of somewhat flexible material, so that when inserted through the filler neck it can be bent to reach through the radiator into the pipe, 11, leading from the engine cylinder jackets not shown. It will be understood that the water coming through the pipe, 11, directly from the engine is necessarily the hottest water in the system, and thus furnishes the most accurate index of conditions in the engine itself. The pipe, 10, is intended to carry a portion of such water up into the cup, 8, from which it may overflow back into the radiator itself, whence it will be circulated back to the engine in the usual manner. To effect such operation, the pipe, 10, is provided near its lower end with a check valve, 12, opening toward the cup, 8, so that any pressure exerted by the flow of water into the radiator (whether such flow be caused by a positive circulating pump or merely by the well understood thermo-syphon action) will operate to open the check valve, 12, and the valve will operate to trap all the water passed through it, until the water level in the pipe, 10, and cup, 8, rises to the brim of the cup. It will be understood that in a very few minutes' running of the engine, the cup, 8, will be filled with water in this manner, and will be kept filled with a constantly changing supply of hot water direct from the engine so long as the circulation is kept up; that is, so long as the engine is kept running.

I claim:—

1. A device for indicating the temperature of the cooling water of an internal combustion engine, comprising, in combination with the radiator, an upwardly-open receptacle for water adapted to be suspended within the radiator below the filling mouth thereof; a tube discharging into said receptacle and extending within the radiator to the inlet orifice thereof; a check valve in said tube opening for flow therethrough into the receptacle and adapted to be seated by reverse flow, and a thermometer device adapted to be mounted on the radiator cap, comprising a heat-responsive element which, when it is thus mounted, protrudes into said receptacle, and a temperature-indicating element which is exposed to view outside the cap.

2. A device for indicating the temperature of the cooling water of an internal combustion engine, comprising, in combination with the radiator, a receptacle for water adapted to be inserted through the radiator filling mouth and to be suspended within the receptacle below said mouth; a tube connected with said receptacle for discharge thereinto, extending from said receptacle within the radiator to the inlet orifice thereof, and having a funnel inlet mouth positioned for receiving water flowing for discharge into the radiator through said inlet orifice, and a thermometer mounted on the radiator cap having its heat-responsive element protruding into said receptacle and its temperature-indicating element exposed to view outside the cap.

3. A device for indicating the temperature of the cooling water of an internal combustion engine, comprising, in combination with the radiator, a water receptacle adapted to be inserted into the radiator through the filling mouth thereof, and means for suspending it within the radiator below said mouth; a tube connected with said receptacle for discharge of water thereinto and extending thence within the radiator to the vicinity of the inlet orifice thereof, and provided with a funnel receiving mouth positioned for receiving water flowing for discharge through said orifice into the radiator; a check valve in said tube opening for flow therethrough toward the receptacle, and adapted to be seated by reverse flow; a thermometer and means for mounting it on the radiator cap with its heat-responsive element protruding into said receptacle and its temperature-indicating parts exposed to view outside the radiator.

In testimony whereof, I have hereunto set my hand at Chicago, Illinois, this 3rd day of July, 1914.

EDWARD A. LARSON.

Witnesses:
C. B. SMITH,
H. BLIVEN.